A. T. Stearns,
Wood Molding Machine.
Nº 63,572. Patented Apr. 2, 1867.
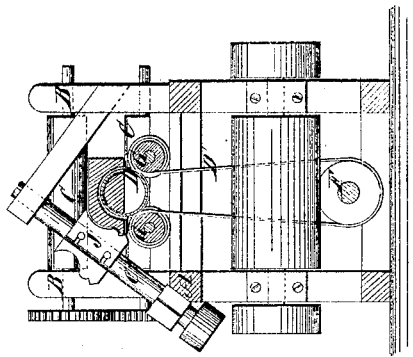
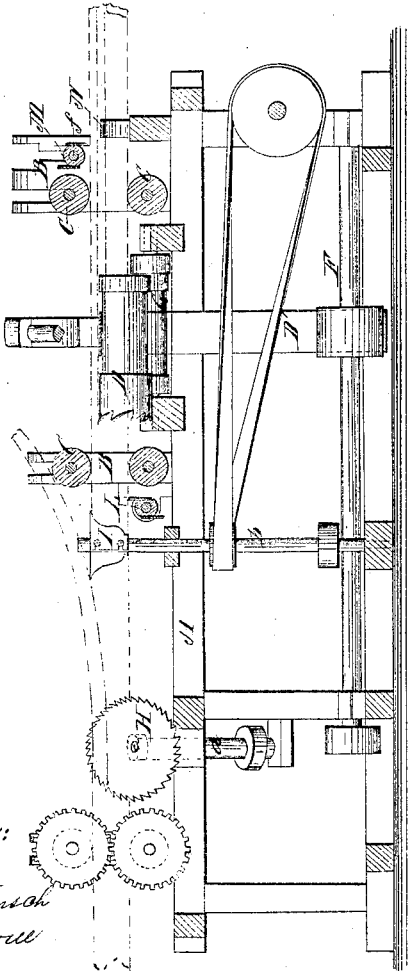
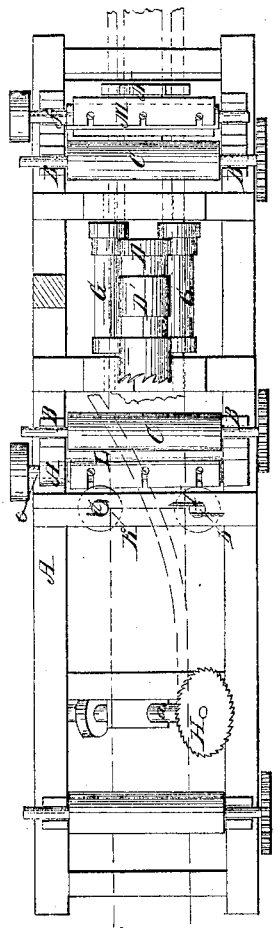
Witnesses:
Inventor:

United States Patent Office.

ALBERT T. STEARNS, OF DORCHESTER, MASSACHUSETTS.

Letters Patent No. 63,572, dated April 2, 1867.

---

IMPROVEMENT IN MACHINES FOR MAKING WOODEN EAVES TROUGHS.

---

The Schedule referred to in these Letters Patent and making part of the same.

---

TO ALL WHOM IT MAY CONCERN:

Be it known that I, ALBERT T. STEARNS, of Dorchester, in the county of Norfolk, and State of Massachusetts, have invented a new and improved Machine for Making Troughs; and I do hereby declare that the following is a full, clear, and exact description thereof, which will enable others skilled in the art to make and use the same, reference being had to the accompanying drawings, forming part of this specification, in which—

Figure 1 represents a longitudinal vertical section of this invention.

Figure 2 is a transverse section of the same.

Figure 3 is a plan or top view of the same, partly in section.

Similar letters of reference indicate like parts.

This invention relates to an improvement in that class of machines for making troughs in which a cylindrical saw is used to cut out the required cavity. In ordinary machines of this class, the stick of timber is secured to a reciprocating carriage by means of dogs, so that that side of the stick which rests on the carriage and its back cannot be reached by cutters while the stick passes through the machine; and, furthermore, much time and power are lost in gigging back, and in removing, replacing, and dogging the sticks. In the new machine, the sticks are fed to the saw by feed-rollers in continuous succession, so that all parts of the machine are constantly at work, and no time is lost in gigging back or fastening and unfastening the sticks. An oblique saw, which is combined with the cylindrical saw, cuts off a strip and prepares the timber for the action of the moulding cutters; and, in order to cut the mouldings with ease, an angular cutter is applied, which reaches over the bottom of the trough, and rounds the edge thereof without difficulty. The back edge and the top and bottom of the trough are planed off by distinct cutters, and a suitable staple retains the core of the trough and prevents the saw from binding. The cylindrical saw rests loosely on a pair of friction-rollers, which also serve to keep the belt tight which is used to drive said saw.

A represents a frame, made of wood or any other suitable material. From this frame rise the standards B B, which form the bearings for two or more pairs of friction-rollers, C C, by which the stick of timber is fed against the saw D. This saw is made in the form of a hollow cylinder, with a recess turned in its outer surface of sufficient width and depth to make room for the driving-belt D'. This belt extends from a drum on the shaft F round the cylindrical saw, and it is held up tight against the saw by friction-rollers G, on which the saw is placed, as shown particularly in fig. 2 of the drawing. The sticks of timber, which are fed against the cylindrical saw, are of a square or rectangular cross-section; and, in order to facilitate the operation of the moulding-cutters, I have applied an angling or oblique saw, H. This saw is mounted on a shaft, $a$, which has its bearings in boxes secured to the frame A at some distance from the cylindrical saw D, and its object is to cut off the corner of the stick, and prepare the same for the action of the moulding-cutters I J. Ordinarily the corner of the stick is cut off with an axe, an operation which requires time and labor; and, furthermore, the strip cut off by my oblique saw can be used for mouldings. I place the oblique saw at some distance from the moulding-cutters I, so that the strip cut off by the same will bend and run off over the top of the feed-rollers, as indicated in red outlines in figs. 1 and 3 of the drawing. The moulding-cutters I are mounted on a vertical shaft, $b$, and they act on the front side of the trough. To obviate the necessity of having the top edges of these cutters extend far over the upper surface of the stick, whereby said cutters are necessarily weakened, and their action is impeded, I have applied the angular cutters J, which are mounted on the oblique shaft $c$, and which easily finish that portion of the trough left unfinished by the cutters I. The back edge of the trough is finished by the cutters K, which are mounted on the vertical shaft $d$, and which may be so arranged that they cut said back edge to a bevel, which is desirable for the purpose of bringing the trough in the proper position when the same is applied to the eaves of a building. The under surface of the stick (which forms the top of the trough when the same is ready) is finished by cutters L, secured to the horizontal arbor $e$, which extends under the stick, as shown, and which may be situated in front of the saw, or on any convenient spot of the machine. A similar set of cutters, M, serves to plane off the top of the stick, (which forms the bottom of the trough when the same is finished.) These cutters are attached to an arbor, $f$, which extends across the frame A, as shown in figs. 1 and 3 of the drawing. The cutters K, L, and M are applicable only in consequence of the use of feed-rollers, or their equivalents, for the purpose of feeding the sticks against the saw. If the sticks are fastened to a carriage, their under surface cannot be reached on account of the carriage, and their back edge and upper surface cannot be reached on account of the dogs which are used to secure the stick to the carriage. By using feed-rollers I am enabled to reach all sides of the stick with equal facility; and I will here remark that, instead of feed-rollers, an endless chain, with suitable hooks or abutments, might be used, and such chain I would consider an equivalent of my rollers, though it must be remarked that I prefer the feed-rollers. As the stick passes out from between the last pair of feed-rollers, the core cut out by the saw is caught under the staple N, which is firmly secured to a cross-bar of the frame A. This staple enters the kerf, and, by bearing on the core, prevents the saw from binding, and at the same time serves to steady the stick. If desired, suitable side rollers or side rests may be used to keep the sticks straight while passing through the machine. By this arrangement the manufacture of troughs is materially facilitated, and a machine is obtained which cuts out troughs with great rapidity and economy in material, time, and labor.

What I claim as new, and desire to secure by Letters Patent, is—

1. The arrangement, upon the frame A, of the cylindrical saw D, oblique saw H, moulding-cutters I J, cutters K L M, friction-rollers C C and G G, substantially as herein set forth for the purpose specified.

2. Operating the hollow cylindrical saw D, by means of the driving-belt D' extending from the drum on the shaft F around the said saw, holding it against the friction-rollers G G, which form its bearings, as herein shown and described.

ALBERT T. STEARNS.

Witnesses:
CHARLES B. WALKER,
ALBERT H. STEARNS.